July 27, 1965 K. H. N. SCHULPEN 3,197,357
YIELDABLY DEFORMABLE MATERIAL HAVING OPEN OR
CLOSED CELLS AND AT LEAST ONE UNDULATED
SURFACE, OR OBJECT OF THIS MATERIAL
Filed Nov. 19, 1956 2 Sheets-Sheet 1

INVENTOR
Karel H. N. Schulpen
BY Stevens, Davis, Miller + Mosher
ATTORNEY

July 27, 1965 K. H. N. SCHULPEN 3,197,357
YIELDABLY DEFORMABLE MATERIAL HAVING OPEN OR
CLOSED CELLS AND AT LEAST ONE UNDULATED
SURFACE, OR OBJECT OF THIS MATERIAL
Filed Nov. 19, 1956 2 Sheets-Sheet 2

INVENTOR

Karel H. N. Schulpen
BY Stevens, Davis, Miller + Mosher
ATTORNEYS

United States Patent Office 3,197,357
Patented July 27, 1965

3,197,357
YIELDABLY DEFORMABLE MATERIAL HAVING OPEN OR CLOSED CELLS AND AT LEAST ONE UNDULATED SURFACE, OR OBJECT OF THIS MATERIAL
Karel H. N. Schulpen, Haviklaan 17, The Hague, Netherlands
Filed Nov. 19, 1956, Ser. No. 623,209
Claims priority, application Germany, Nov. 21, 1955.
S 46,425; Netherlands, Feb. 13, 1956, 204,488
3 Claims. (Cl. 161—116)

This invention relates to an object of yieldably deformable material having open or closed cells and being suitable to be used as or processed to an object of the group to which mattresses, cushions, blankets, pads or padding plates for upholstering purposes belong. As material foam- and sponge-like natural or synthetic substances, which material may resume its original shape after deformation, are particularly considered. Objects of this material which have the shape of a massive block with a flat upper and lower side have the disadvantage that when their thickness is of the desired magnitude they are not sufficiently elastic to be used for the above-mentioned purposes and that, moreover, such massive blocks require a large quantity of material.

The present invention avoids these disadvantages in that the object has at least one undulated or arched surface. The result is that although the object has a large thickness the undulation or arch imparts to said objects a high elasticity since at the place of the undulation or arch the material may easily be compressed. When from one single block or one single plate of this material two or more objects are simultaneously formed by cutting and the undulations or arches of these objects fit into each other, the advantage is obtained that little material is required for manufacturing these objects.

According to the invention the object may be provided on at least one side with uninterrupted continuous undulatory elevations and depressions. These elevations and depressions may be arranged in a zigzag-like, oblique or some other manner and may have any desired cross section.

According to a preferred embodiment of the object according to the invention this object may be provided on at least one side with elevations and depressions arranged in staggered position relatively to each other. These elevations form nobs or lumps which may be interconnected by low ridges. In this way a strong unit is obtained which may be easily compressed.

When the top and bottom side of an object is provided with elevations and depressions, the elevations on one side of the object may correspond with depressions on the other side. Consequently an object of very small weight is obtained.

According to the invention composite objects may be made from the above-described objects. In that case it is preferred to connect the elevations to each other by glueing or in some other manner. Consequently it is possible to use a plate or block of material of a certain height for the manufacture of an object having a much greater height.

If desired the objects according to the invention may be provided with holes.

According to the invention the above-described objects may be manufactured of material which is deformed in one or more places and thereupon subdivided by cutting, sawing, milling or in some other manner in a direction transversely to the deformed places, the material, after being deformed being subdivided according to one or more planes lying at least partly between the upper and bottom face of the material in such a manner that at least two objects with elevations and depressions of the same kind are formed in one single operation out of one piece of material only. This results not only in the advantage of a quick operation but also in the advantage that no waste material is produced. The cutting means may have a single or multiple construction, and may consist, for instance, of two cutting knives or cutting bands rapidly reciprocating relatively to each other and lying with one flat side substantially against each other, but it is also possible to guide these cutting means in such a way that they follow an arbitrary path deviating from a straight line.

The invention will be elucidated below with reference to the accompanying drawings showing by way of example some embodiments of the device according to the invention.

Figure 1:
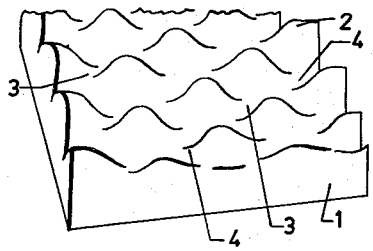
FIGS. 1 to 6 show six different embodiments of the object according to the invention in perspective.

The object shown in FIG. 1 comprises a base portion of foam substance, said base portion being provided with a plurality of elevations 2 and depressions 3 arranged in staggered position relatively to each other and interconnected by ridge-like portions 4.

Figure 2:
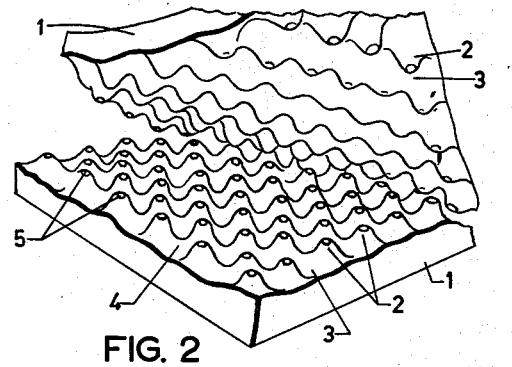

FIG. 2 shows an embodiment which differs from the embodiment according to FIG. 1 only in that the elevations 2 have a somewhat conical shape with a crater-like recess in the top 5. From this figure it may be seen that these two objects may be formed out of one single block of foam substance or some other yieldably deformable material and that the elevations of one object fit into the depressions of the other object and vice versa. These objects, like those of FIG. 1, may be used as a mattress, cushion, pad for upholstering purposes etc.

Figure 3:
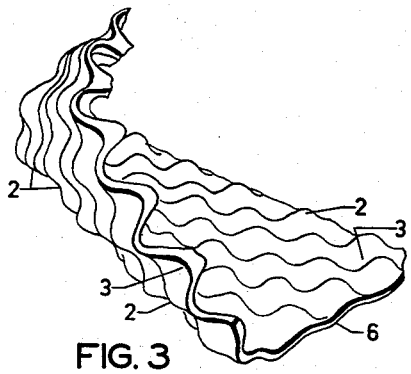

In the embodiment according to FIG. 3 elevations 2 and depressions 3 are provided both on the upper side and on the lower side of a sheet 6 of yieldably deformable material, the elevations 2 on one side corresponding with depressions 3 on the other side.

Figure 4:
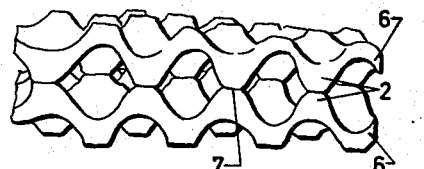

FIG. 4 shows an embodiment in which the tops 7 of the elevations 2 of two sheets 6 of the type according to FIG. 3 are secured to each other, for instance by glueing. In this way a strong object is obtained which may serve for instance as a blanket.

Figure 5:
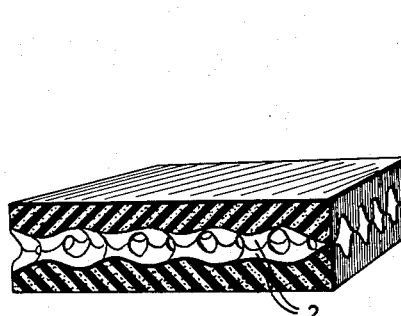

FIG. 5 shows an object composed of two objects with a base portion 1 according to FIG. 1 in that the tops of the elevations 2 are secured to each other. Such an object may be used for the same purposes as those of the objects according to FIGS. 1 and 2.

Figure 6:
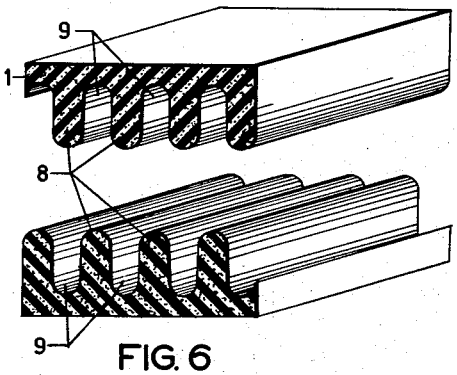

FIG. 6 shows two objects with a base portion 1 provided with uninterrupted continuous undulatory elevations 8 and depressions 9. This figure, like FIG. 2, shows that these objects may be made out of one single block or single plate of material without the production of waste material since the elevations 8 of one base portion fit into the depressions 9 of the other base portion.

Figure 7:
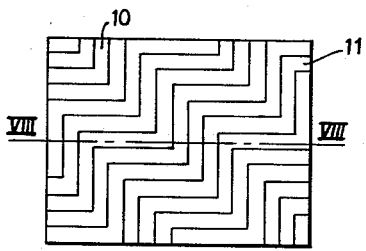
FIGS. 7 to 10 show two other embodiments in top plan view and in section respectively.
Figure 8:
Figure 9:
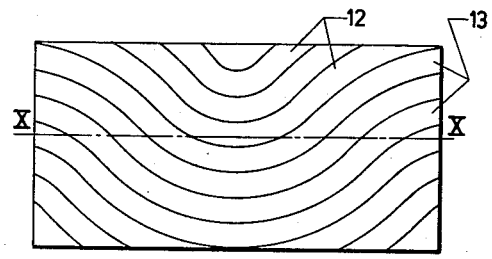
Figure 10:
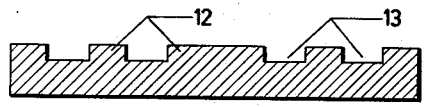

FIGS. 7 and 8 show an object of which the uninterrupted continuous elevations 10 and depressions 11 are made zigzag-like. These elevations have a rectangular cross section. In the embodiment according to FIGS. 9 and 10 the elevations 12 and depressions 13 are arranged according to a wave line.

Figure 11:
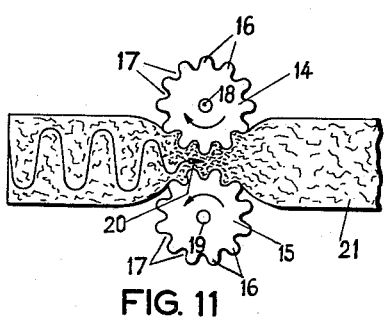
FIG. 11 shows diagrammatically a device for carrying out the method according to the invention.

FIG. 11 shows a device by means of which the objects according to FIGS. 1 to 10 may be manufactured. Reference numerals 14 and 15 designate two sets of discs or cylinders having elevations 16 and depressions 17 arranged in staggered position relatively to each other. These discs or cylinders are arranged at a distance from each other and are driven by the shafts 18, 19 in the sense of the arrows shown. Between these discs or cylinders a cutting knife 20 is arranged. This cutting knife may consist for example of two strips or bands rapidly reciprocating relatively to each other and being subjected to spring action, these strips or bands being arranged in such a manner that they support each other. When a block of material 21 is caught by the discs or cylinders it is propelled further on by these discs or cylinders and compressed by the discs or cylinders and cut through by the cutting knife 20. Consequently two objects are formed according to FIGS. 1, 2 and 7 to 10. If one wishes to manufacture objects according to FIG. 3, two cutting knives 20 are used which are arranged at a small distance from each other. When the block of material has passed through the device one obtains two objects according to FIGS. 1, 2 and 7 to 10 and one object according to FIG. 3. When using more than two cutting knives 20, one obtains a correspondingly higher number of objects according to FIG. 3. The thickness of these objects depends on the distance at which these cutting means are arranged when carrying out the method according to the invention.

It is also possible to cut objects according to FIG. 3 with one single knife. To this end the block of material is first cut through at a certain height whereupon the cutting knife is displaced over such a distance as corresponds to the required thickness of the object and the cutting operation is repeated. This may, if desired, be repeated several times so that two or more objects according to FIG. 3 are obtained.

Figure 12:
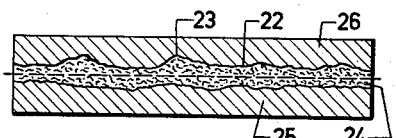
FIG. 12 shows another device for carrying out the method according to the invention.

It is obvious that the invention is not restricted to the embodiments described above by way of example but that it is possible to modify these in numerous ways without departing from the scope of the invention. If one wishes to make objects with holes, it is only necessary to arrange, for instance on the extremities of the elevations 16 of the discs or cylinders, portions which may be cut through by the cutting means. It is also possible to provide holes in the objects when the staggered elevations have been arranged so closely between each other that the cutting means just glides past the elevations so that at those places it operates outside the material and holes are made only at said places. As shown in FIG. 12 with reference numerals 22 and 23 the elevations and depressions may have an arbitrary form so that consequently two objects having an arbitrarily shaped surface are obtained when the material is cut through according to the dash line 24. These elevations and depressions are arranged in plates 25 and 26 adapted to be moved towards and away from each other. Other embodiments of devices with which the method according to the invention may be carried out are described in applicant's patent application having the same date as the present patent application.

What is claimed is:

1. A cushioning or padding element for upholstering purposes comprising multicellular spongy material having on at least one side uninterrupted continuous undulatory elevations and depressions, said undulatory elevations and depressions being in a zigzag relationship and being produced by a mechanical subdividing operation.

2. A cushioning or padding element for upholstering purposes comprising multicellular spongy material having at least one undulated surface, said element having on at least one side elevations and depressions arranged in staggered position relatively to each other and produced by a mechanical subdividing operation.

3. A cushioning or padding element for upholstering purposes comprising multicelluar spongy material having on the top and bottom elevations and depressions arranged in staggered position relatively to each other, the elevations on one side corresponding with the depressions on the other side and produced by a mechanical subdividing operation.

References Cited by the Examiner

UNITED STATES PATENTS

| | | | |
|---|---|---|---|
| 1,670,514 | 5/28 | Lane | 12—63 |
| 1,731,132 | 10/29 | Hendry et al. | 83—4 |
| 2,145,731 | 1/39 | Minor | 264—50 |
| 2,214,461 | 9/40 | Hendry | 183—176 |
| 2,241,478 | 5/41 | Remington | 12—1 |
| 2,371,788 | 3/45 | Weeber | 161—159 |
| 2,404,731 | 7/46 | Johnson | 12—146 |
| 2,617,751 | 11/52 | Bickett | 161—159 |
| 2,619,659 | 12/52 | Futterknecht | 5—361 |
| 2,692,328 | 10/54 | Jaye | 219—19 |
| 2,836,228 | 5/58 | Dahle | 267—1 |
| 3,026,544 | 3/62 | Persicke et al. | |

EARL M. BERGERT, *Primary Examiner.*

CARL F. KRAFFT, R. LEIBOWITZ, *Examiners.*